US009913220B2

(12) United States Patent
Dai et al.

(10) Patent No.: US 9,913,220 B2
(45) Date of Patent: *Mar. 6, 2018

(54) ENERGY EFFICIENT LOCATION TRACKING ON SMART PHONES

(71) Applicant: International Business Machines Corporation, Armonk, NY (US)

(72) Inventors: Jing Dai, White Plains, NY (US); Ming Li, Elmsford, NY (US); Milind R. Naphade, Fishkill, NY (US); Sambit Sahu, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/064,913

(22) Filed: Oct. 28, 2013

(65) Prior Publication Data

US 2014/0045535 A1 Feb. 13, 2014

Related U.S. Application Data

(63) Continuation of application No. 13/307,754, filed on Nov. 30, 2011, now Pat. No. 8,588,810.

(51) Int. Cl.
*G01S 19/34* (2010.01)
*G01S 19/47* (2010.01)
(Continued)

(52) U.S. Cl.
CPC ......... *H04W 52/0251* (2013.01); *G01S 19/34* (2013.01); *G01S 19/47* (2013.01);
(Continued)

(58) Field of Classification Search
CPC .............. H04W 4/02; H04W 52/0254; H04W 52/0274; H04W 88/06; H04W 4/027;
(Continued)

(56) References Cited

U.S. PATENT DOCUMENTS 5,953,677 A 9/1999 Sato
6,204,808 B1 3/2001 Bloebaum
(Continued)

FOREIGN PATENT DOCUMENTS

GB 2451616 2/2009

OTHER PUBLICATIONS

Freescale Smartphones, downloaded Nov. 10, 2011 from http://www.freescale.com/webapp/sps/site/application.jsp?code=APLSMAPHONE.
(Continued)

*Primary Examiner* — Dinh P Nguyen
(74) *Attorney, Agent, or Firm* — Louis J. Percello; Otterstedt, Ellenbogen & Kammer, LLP

(57) ABSTRACT

A GPS-enabled cellular electronic device is operated in an indoor mode. An increase in strength of a cellular signal is detected at the GPS-enabled cellular electronic device. Responsive at least to the increase in cellular signal strength, the GPS-enabled cellular electronic device is transitioned to an outdoor testing mode. Detecting is carried out to determine whether movement of the GPS-enabled cellular electronic device occurs during the outdoor testing mode. If so, the GPS-enabled cellular electronic device is transitioned to an outdoor mode.

23 Claims, 6 Drawing Sheets

(51) Int. Cl.

| | | |
|---|---|---|
| *G01S 19/48* | (2010.01) | |
| *H04M 1/24* | (2006.01) | |
| *H04M 1/725* | (2006.01) | |
| *H04W 52/02* | (2009.01) | |
| *H04W 4/04* | (2009.01) | |
| *H04W 4/02* | (2009.01) | |
| *H04W 48/16* | (2009.01) | |

(52) U.S. Cl.
CPC ............... *G01S 19/48* (2013.01); *H04W 4/02* (2013.01); *H04W 4/043* (2013.01); *H04M 1/24* (2013.01); *H04M 1/72572* (2013.01); *H04M 2250/10* (2013.01); *H04W 4/027* (2013.01); *H04W 48/16* (2013.01); *Y02B 60/50* (2013.01)

(58) Field of Classification Search
CPC . H04W 52/0251; H04W 48/04; H04W 48/16; H04W 4/043; H04M 1/72569; H04M 1/24; H04M 2250/10; H04M 1/72572; G01S 19/34; G01S 19/47; G01S 19/48; Y02B 60/50
USPC ........... 370/311, 338; 455/456.1, 456.3, 457, 455/414.1, 418, 456.6
See application file for complete search history.

(56) References Cited

U.S. PATENT DOCUMENTS

| | | |
|---|---|---|
| 6,438,381 B1 | 8/2002 | Alberth, Jr. |
| 6,501,420 B2 | 12/2002 | Townsend |
| 6,999,776 B2 | 2/2006 | Ogino |
| 7,009,555 B2 | 3/2006 | Tsujimoto |
| 7,408,506 B2 | 8/2008 | Miller |
| 7,409,188 B2 | 8/2008 | Syrjarinne |
| 2004/0192352 A1 | 9/2004 | Vallstrom |
| 2006/0057987 A1 | 3/2006 | Nail |
| 2007/0152878 A1* | 7/2007 | Wang et al. ............. 342/357.06 |
| 2007/0239813 A1* | 10/2007 | Pinder et al. ................. 708/270 |
| 2008/0159226 A1 | 7/2008 | He |
| 2008/0176580 A1 | 7/2008 | Dery |
| 2009/0098880 A1* | 4/2009 | Lindquist ................... 455/456.1 |
| 2009/0168853 A1 | 7/2009 | Gobara |
| 2009/0170479 A1 | 7/2009 | Jarenskog |
| 2010/0039316 A1 | 2/2010 | Gronemeyer |
| 2011/0211511 A1 | 9/2011 | Bakthavathsalu |
| 2012/0264446 A1 | 10/2012 | Xie |
| 2013/0035110 A1 | 2/2013 | Sridhara |

OTHER PUBLICATIONS

Locale (Android application) downloaded Oct. 20, 2011 from http://www.twofortyfouram.com/.
Freescale Multimedia Applications: Smartphones, downloaded Nov. 10, 2011 from http://cache.freescale.com/files/shared/doc/selector_guide/SG2143.pdf.
Wikipedia: Smartphone, downloaded Nov. 10, 2011 from http://en.wikipedia.org/wiki/Smartphone.
Wikipedia: Global Positioining System, downloaded Nov. 30, 2011 from http://en.wikipedia.org/wiki/Gps.
WIPO—ISA/US, International Search Report and Written Opinion, PCT/US12/66867, dated Mar. 8, 2013.
Rene Hansen et al, "Seamless Indoor/Outdoor Positioning Handover for Location-Based Services in Streamspin". 2009 IEEE.
Thomas Gallagher et al, "Power Efficient Indoor/Outdoor Positioning Handover" Sep. 21-23, 2011.

* cited by examiner

ENERGY EFFICIENT LOCATION TRACKING ON SMART PHONES

CROSS-REFERENCE TO RELATED APPLICATIONS

This application is a continuation of U.S. patent application Ser. No. 13/307,754 filed Nov. 30, 2011. The complete disclosure of U.S. patent application Ser. No. 13/307,754 is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to mobile telephony and the like.

BACKGROUND OF THE INVENTION

A smartphone is an advanced cellular telephone that includes functionality similar to that of a personal digital assistant (PDA), including execution of various kinds of applications, as well as that of a mobile phone. Currently, many smartphone applications use an on-board global positioning system (GPS) receiver for location tracking, e.g. navigation, property tracking, and mobility studies of people.

SUMMARY OF THE INVENTION

Principles of the invention provide techniques for energy efficient location tracking on smartphones. In one aspect, an exemplary method includes the steps of operating a GPS-enabled cellular electronic device in an indoor mode; detecting, at the GPS-enabled cellular electronic device, an increase in strength of a cellular signal; responsive at least to the increase in cellular signal strength, transitioning the GPS-enabled cellular electronic device to an outdoor testing mode; detecting whether movement of the GPS-enabled cellular electronic device occurs during the outdoor testing mode; and transitioning the GPS-enabled cellular electronic device to an outdoor mode, if the movement occurs.

In another aspect, another exemplary method includes the steps of operating a GPS-enabled cellular electronic device in an indoor mode; detecting, at the GPS-enabled cellular electronic device, an increase in strength of a cellular signal and a decrease in strength of a Wi-Fi signal; and responsive to the increase in cellular signal strength and the decrease in Wi-Fi signal strength, transitioning the GPS-enabled cellular electronic device to an outdoor mode.

In still another aspect, a GPS-enabled cellular electronic device includes a memory; a cellular transceiver module; a GPS receiver module; an accelerometer; and at least one processor, coupled to the memory, the cellular transceiver module, the accelerometer, and the GPS receiver module. The at least one processor is operative to: operate the GPS-enabled cellular electronic device in an indoor mode; detect, in conjunction with the cellular transceiver module, an increase in strength of a cellular signal; responsive at least to the increase in cellular signal strength, transition the GPS-enabled cellular electronic device to an outdoor testing mode; detect, in conjunction with the accelerometer, whether movement of the GPS-enabled cellular electronic device occurs during the outdoor testing mode; and transition the GPS-enabled cellular electronic device to an outdoor mode, if the movement occurs.

In a further aspect, a GPS-enabled cellular electronic device includes a memory; a cellular transceiver module; a Wi-Fi transceiver module; a GPS receiver module; and at least one processor, coupled to the memory, the cellular transceiver module, the Wi-Fi transceiver module, and the GPS receiver module. The at least one processor is operative to: operate the GPS-enabled cellular electronic device in an indoor mode; detect, in conjunction with the cellular transceiver module and the Wi-Fi transceiver module, an increase in strength of a cellular signal and a decrease in strength of a Wi-Fi signal; and, responsive to the increase in cellular signal strength and the decrease in Wi-Fi signal strength, transition the GPS-enabled cellular electronic device to an outdoor mode.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

- An energy efficient two-step approach that detects smartphones moving into/out of buildings with low false detection rate
- An adaptive process that chooses different detection models based on availability of different sensors
- An adaptive process that detects significant changes in cellular/WiFi signals in diverse environments
- An efficient process that detects drastic movement from acceleration sensor readings with low memory/computation footprint
- An adaptive process that detects in-door/out-door status of a Smartphone based on Wi-Fi basic service set identification (BSSID)

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
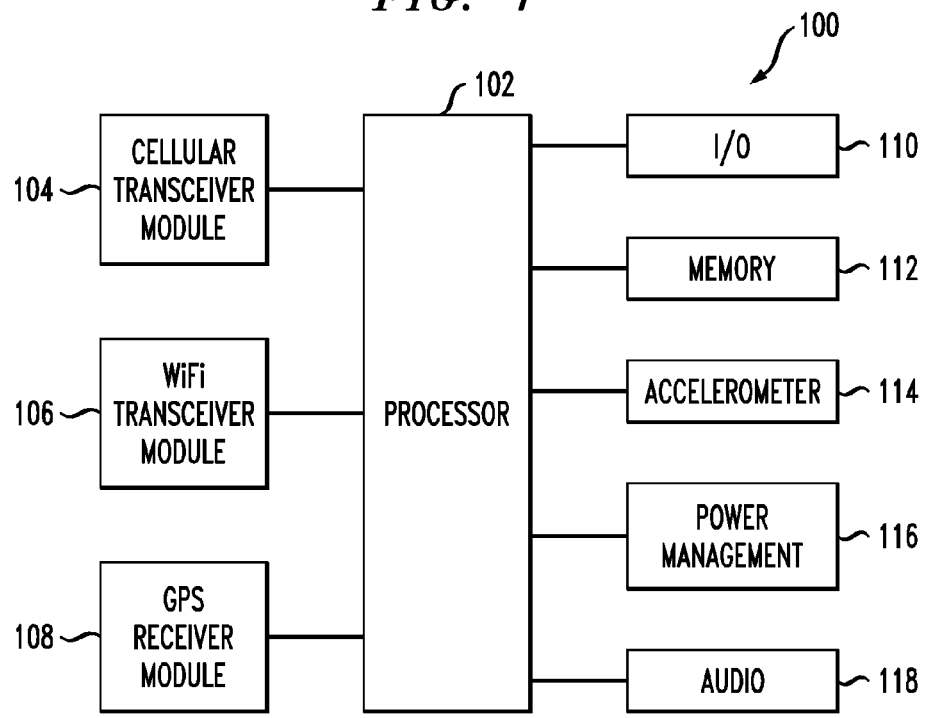
FIG. 1 is a block diagram of a cellular telephone implementing one or more aspects of the invention.

FIG. 1 is a block diagram of an exemplary smart phone 100 implementing an embodiment of the invention. Phone 100 includes a suitable processor; e.g., a microprocessor 102. A cellular transceiver module 104 coupled to processor 102 includes an antenna and appropriate circuitry to send and receive cellular telephone signals. A WiFi transceiver module 106 coupled to processor 102 includes an antenna and appropriate circuitry to allow phone 100 to connect to the Internet via a wireless network access point or hotspot. The skilled artisan will appreciate that "Wi-Fi" is a trademark of the Wi-Fi Alliance and the brand name for products using the IEEE 802.11 family of standards. A GPS receiver module 108 coupled to processor 102 includes an antenna and appropriate circuitry to allow phone 100 to calculate its position by precisely timing the signals sent by GPS satellites high above the Earth.

A preferred implementation of the invention uses software in memory 112 which when loaded into RAM causes the processor 102 to implement the logic in the equations and figures.

Input-output (I/O) block 110 coupled to processor 102 is indicative of a variety devices such as a touch screen, keypad, a display, and so on. Memory 112 coupled to processor 102 is discussed further below. Accelerometer 114 coupled to processor 102 detects acceleration of phone 100. Audio module 118 coupled to processor 102 includes, for example, an audio coder/decoder (codec), speaker, headphone jack, microphone, and so on. Optionally, a command system for responding to voice commands via automatic speech recognition can be provided. Power management system 116 can include a battery charger, an interface to a battery, and so on.

Currently, many smart phone applications use on-board GPS receivers 108 for location tracking; e.g., navigation, property tracking, and mobility studies pertaining to people. A common constraint of these applications is the high energy footprint of GPS signal acquisition, which may significantly shorten the battery life of smart phones, especially when the GPS signal is weak due to blockage by buildings or the like. One or more embodiments advantageously provide an energy efficient location tracking approach that eliminates unnecessary GPS probes and hence increase battery life significantly.

One or more embodiments advantageously make use of WiFi signal strength and/or motion sensor inputs in order to toggle a GPS-enabled cell phone or the like between indoor and outdoor modes. Furthermore, one or more embodiments employ cellular signal change as an indication of indoor/outdoor environment change. In one or more embodiments, no user input is required to detect such an environment change. Advantageously, one or more embodiments work well even if users carrying cellular phones move around a lot in an indoor environment.

One or more embodiments thus reduce energy consumption of the GPS receiver on cellular phones or the like. In particular, the GPS receiver on smart phones consumes orders of magnitude more energy in location acquisition if the GPS signal strength is weak; e.g., when the smart phone is inside a building. In order to conserve battery power, one or more embodiments provide an adaptive power control method that detects whether a smart phone is indoors or outdoors, and automatically switches the GPS receiver on or off accordingly. In one or more embodiments, the detection technique takes into account both cellular and WiFi signal strength, as well as motion sensor readings on smart phones.

In one or more embodiments, energy consumption of tracking applications is minimized and users do not need to toggle the tracking applications or the GPS receiver manually.

Energy consumption for GPS sampling is proportional to the amount of time the GPS receiver unit is kept on. When the receiver has good reception of GPS satellite signals (typically, when it has a clear view of the sky), the receiver can synchronize with satellites instantaneously. In this case, the GPS receiver only needs to be on for a time period ranging from hundreds of milliseconds to a couple of seconds in order to obtain the current location. On the other hand, when the reception of the satellite signal is not good; e.g., when the user is inside a building, the GPS receiver needs a long time to synchronize with satellites, or else eventually times out. The receiver has to be kept on during the whole process, which can be as long as a couple of minutes. Therefore, GPS sampling when the signal strength is weak consumes orders of magnitude more energy than when the signal is strong.

According to the above finding, in phones not employing on or more techniques of the invention, smart phone users need to manually turn off the GPS unit when they are inside a building, which is inconvenient. On the other hand, one or more embodiments of the invention provide a method that detects when a user moves in and out of a building, so that the GPS unit can be turned on and off automatically. Specifically when a user moves into a building, the tracking application can turn off the GPS unit to save energy, and when the user moves out of the building, the tracking application can turn on the GPS unit in time to capture the user's movement. In this manner, users can leave the tracking applications on all the time without draining the batteries.

One or more embodiments advantageously leverage energy efficient sensors on smart phones. Cellular and WiFi radios 104, 106 are typically always on and so no additional cost is incurred to employ them. Accelerometer 114 consumes one order of magnitude lower energy than GPS 108.

It is seen that when a phone is exiting a building, the cellular signal increases and the WiFi signal decreases because the building blocks the cellular signal; furthermore, the accelerometer often shows more drastic movements because people walk. Thus, in one or more embodiments, any one, some, or all of the following features are sued to detect the phone moving out of the building:

- Cellular signal strength increases
- WiFi signal strength decreases
- Accelerometer shows drastic movements In one or more instances of the invention, smart phone users' in or out of building status is detected based on GPS satellite signal strength, cellular tower signal strength, WiFi access point signal strength, and readings from motion sensors embedded on smart phones. An exemplary work flow will now be described with respect to FIG. 2. Three states of the phone are defined: out-building 202, in-building 204, and out-building-test 206.

The out-building state 202 is defined as when the GPS receiver has good reception of the GPS signal. The out-building state is detected when the GPS signal can be decoded successfully. In out-building mode, the GPS receiver is powered on approximately every 30 seconds or 1 minute to accurately capture the phone's location.

The in-building state 204 is defined as when the GPS receiver cannot receive or decode the GPS signal. The in-building state is detected when the GPS signal cannot be detected or decoded successfully. In in-building mode, the GPS receiver is only powered on approximately once every 30 minutes or 1 hour to conserve battery power.

The out-building-test state 206 is a testing state from an in-building state to an out-building state in order to make sure that the phone is actually out of doors. The testing is based on walking detection using motion sensors.

For illustrative purposes, assume in the beginning that the phone is in out-building state 202. The out-building to in-building state transition happens when the GPS signal changes from good reception to no reception. This means that he user just moved into a building that is blocking the GPS signal. The sampling rate of the GPS receiver is reduced accordingly. The last location read in the out-building state 202 is cached on the phone and is provided to any application acquiring location during the in-building state.

The in building 204 to out-building-test state 206 transition happens when the cellular signal strength increases and the WiFi signal strength decreases. In the in-building state, the phone monitors the signal strength of cellular tower and WiFi access points. If the cellular signal strength increases beyond a threshold, and the WiFi signal decreases beyond a threshold, the phone user might be moving out of the building. This is because the building material can both block cellular signals from outside, and can contain WiFi signals from access points inside the building. Therefore, when the user moves out of a building, the cellular and the WiFi signal strengths change in the opposite direction. In a non-limiting exemplary embodiment, a value of (2*standard deviation of signal strength) in the last 5 minutes time window is employed as the threshold to detect significant changes.

The out-building-test state 206 to out-building state 202 happens when the motion sensor detects that the smart phone user is walking or otherwise moving. Once the above signal change pattern is detected, the phone's motion sensor is activated to sense the user's movement. In a non-limiting exemplary embodiment, the sampling rate of the motion sensor is set at 0.5 second in order to capture the user's walking behavior. At least some instances employ a low-pass filtering algorithm to detect drastic movements. Specifically, at least some instances compare the difference of acceleration between two adjacent readings from the motion sensor and calculate the average difference in a one minute time window. If the average is higher than a threshold, a determination is made that the user is walking. Once this walking behavior is detected, the motion sensor is powered off and the GPS sensor is powered on. If the GPS signal is strong, then the phone shifts to out-building mode 202 and the GPS sampling rate is set to 30 seconds or 1 minute. If the GPS signal is not obtained, then the phone stays in in-building mode and the GPS unit is turned off again.

Thus, by way of review, in the out-door state 202, the GPS receiver 108 is more frequently powered (e.g., every minute) to obtain the current location. If the GPS signal is lost for n times (i.e., n attempts are made to acquire the GPS signal), the phone switches to in-door state 204. In some embodiments, n is picked between 2 to 5 depending on the energy budget it is desired to achieve. In the in-door state, GPS receiver 108 is less frequently powered, e.g., every hour to conserve energy. If the cellular signal increases and the WiFi signal decreases, the phone switches to out-door-testing state 206. In out-door-testing state 206, accelerometer 114 is powered for a predetermined time period; e.g., 10 minutes. If movement is detected, the phone switches to out-door state 202. Otherwise, if there is no movement detected, the phone goes back to in-door state 204. One or more embodiments thereby avoid false detection and wasteful GPS operation, as indicated at 208.

Thus, one or more embodiments provide a method and system for energy efficient in-door/out-door detection on smart phones. In-door/out-door detection identifies when a smart phone carried by a user moves into and out of buildings. Non-limiting examples of applications include:

- Toggling GPS receiver when smart phones move into and out of buildings
- Changing ring tones when smart phones move into and out of buildings
- Targeted advertisement when smart phones move into a specific shop One or more embodiments conserve energy to ensure battery life, inasmuch as the GPS receiver consumes a lot of energy indoors, so that other efficient sensors are advantageously employed. One or more embodiments can function successfully in a diverse environment, taking into account that different building structures attenuate wireless signals at different levels, different smart phones have different combinations of sensors; WiFi signal availability may vary among environments, and different people move differently when walking.

One or more embodiments provide an energy efficient two-step approach that detects smart phones moving into and out of buildings with a low false detection rate. One or more embodiments also provide an adaptive process that chooses different detection models based on availability of different sensors. One or more instances employ an adaptive process that detects significant changes in cellular and/or WiFi signals in a diverse environment. In at least some cases, an efficient process is employed, which detects drastic movement from acceleration sensor readings with a low memory and/or computation footprint. Some embodiments employ an adaptive process that detects the in-door/out-door status of a smart phone based on WiFi BSSID.

Figure 3:
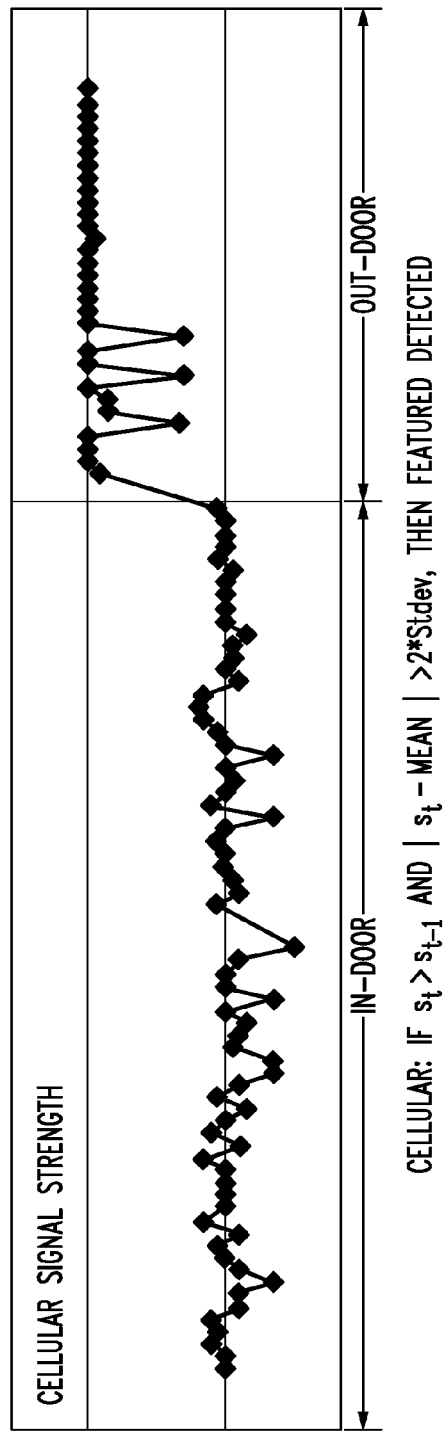
FIGS. 3 & 4 show, respectively, cellular and WiFi feature detection, in accordance with an aspect of the invention.

FIG. 3 shows cellular feature detection. In particular:

$$\text{If } s_t > s_{t-1} \text{ and } |s_t - \text{Mean}| > 2*\text{Stdev, then feature detected} \quad (1)$$

Stated in prose, if the cellular signal strength at time t, $s_t$, is greater than the cellular signal strength at time t−1, $s_{t-1}$, and if the cellular signal strength at time t, $s_t$, less the mean value, is greater than twice the standard deviation, then a transition from in-door to out-door is suspected. In an exemplary embodiment, the window size is 10 so the period is 10*interval(2 minutes)=20 minutes before t till t).

Figure 4:
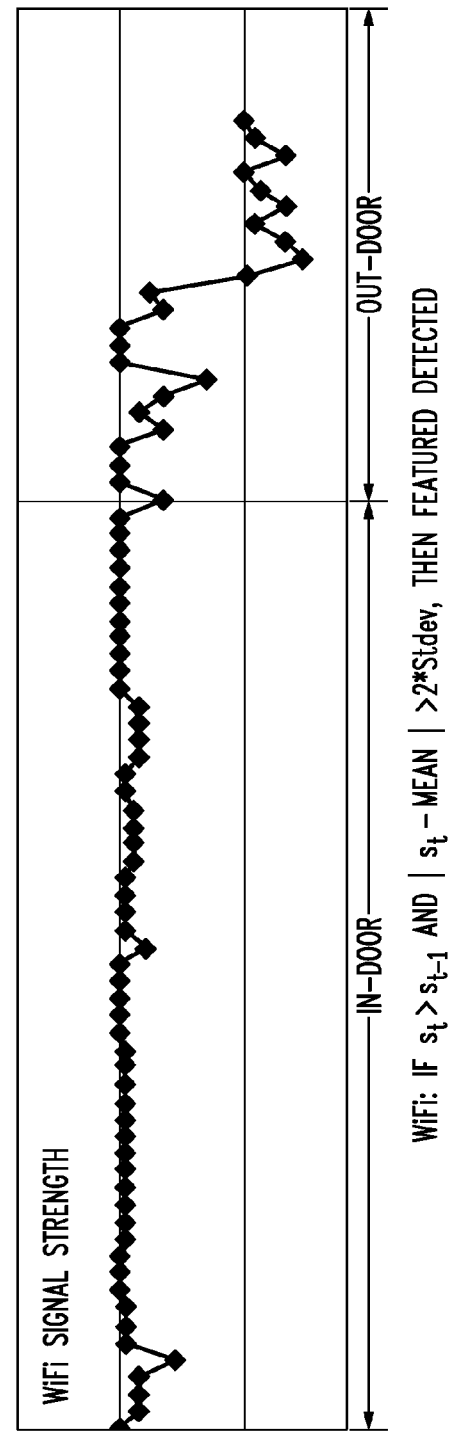

FIG. 4 shows WiFi feature detection. In particular:

$$\text{If } s_t < s_{t-1} \text{ and } |s_t - \text{Mean}| > 2 \cdot \text{Stdev, then feature detected.} \quad (2)$$

Stated in prose, if the WiFi signal strength at time t, $s_t$, is less than the WiFi signal strength at time t−1, $s_{t-1}$, and if the WiFi signal strength at time t, $s_t$, less the mean value, is greater than twice the standard deviation, then a transition from in-door to out-door is suspected.

Figure 5:
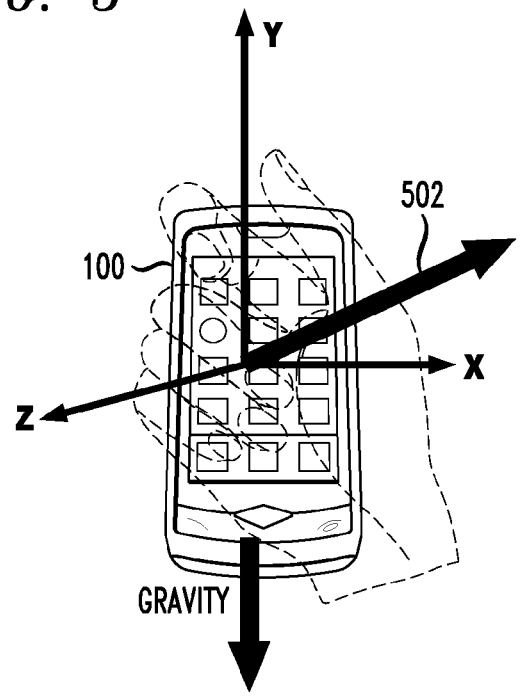
FIGS. 5 & 6 show acceleration feature detection, in accordance with an aspect of the invention.
Figure 6:
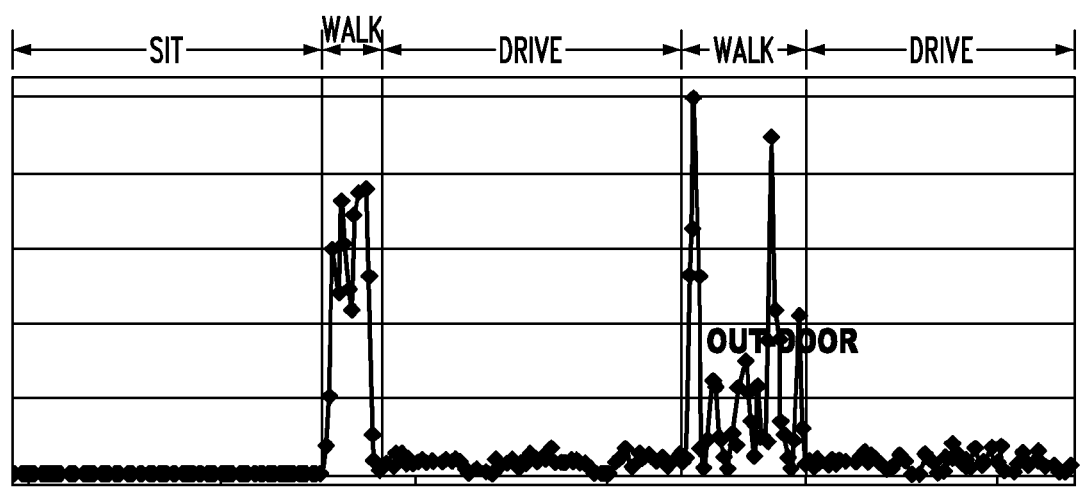

FIGS. 5 and 6 illustrate exemplary acceleration feature detection. FIG. 5 shows cell phone 100 with x, y, and z axes; a gravity vector; and an acceleration vector 502. FIG. 6 shows the magnitude of the acceleration vector 502 versus time for various conditions as indicated; namely, sitting, walking, driving, outdoor walking, and driving.

One or more embodiments employ a low-pass filter with a low memory/computation footprint. In one or more embodiments, only five numbers are stored, namely, Sum, N, accx, accy, accz. The latter three numbers are the acceleration values in the x, y, and z directions, respectively; the Sum is given by the formula below; and N is a counter. After each sampling:

$$\text{Sum} = \text{Sum} + (|accx_n - accx_{n-1}| + |accy_n - accy_{n-1}| + |accz_n - accz_{n-1}|) \quad (3)$$

$$N = N+1 \quad (4)$$

when N reaches window size (e.g. 10):

$$\text{If Sum}/N > \text{threshold, then movement is detected.} \quad (5)$$

Advantageously, the calculations include mostly addition and subtraction operations, which are efficient on embedded processors. Re-stated in prose, the value of Sum is incremented by the sum of the absolute values of the change in the acceleration in each of the x, y, and z directions. If the average (Sum divided by number of sampling windows) exceeds a threshold, movement is detected.

Figure 7:
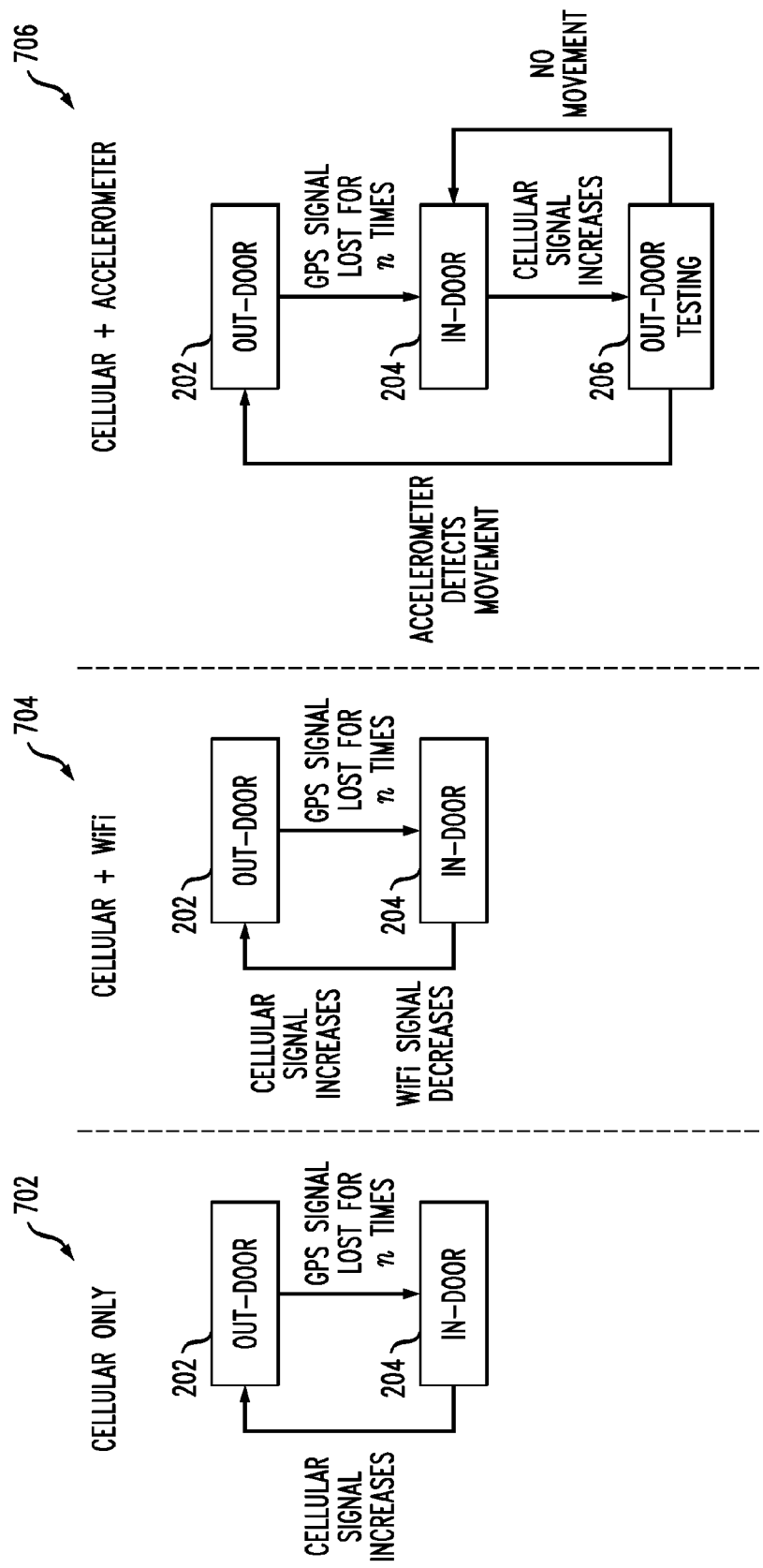
FIG. 7 shows adaptation to the availability of sensors, in accordance with an aspect of the invention.

FIG. 7 compares how the technique may be adapted to the availability of sensors. At 702, only the cellular signal is available and can be sensed by cell phone 100. An outdoor to indoor transition occurs when the GPS signal is lost for n times; an indoor to outdoor transition occurs when the cellular signal increases. At 704, the cellular and WiFi signals are available and can be sensed by cell phone 100. An outdoor to indoor transition occurs when the GPS signal is lost for n times; an indoor to outdoor transition occurs when the cellular signal increases and the WiFi signal decreases. At 706, the cellular and accelerometer signals are available and can be sensed by cell phone 100. An outdoor to indoor transition occurs when the GPS signal is lost for n times; and an indoor to outdoor testing transition occurs when the cellular signal increases. If the accelerometer detects no movement, it is assumed that the phone remains in the indoor environment. If the accelerometer detects movement, a transition is made to the outdoor mode.

Figure 8:
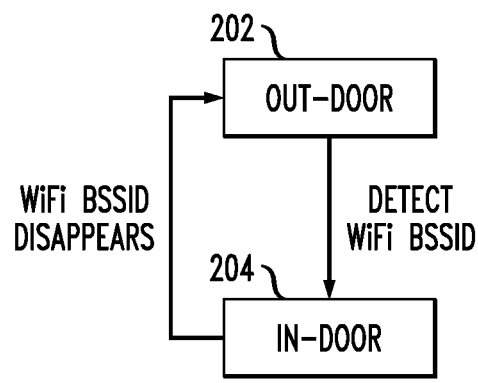
FIG. 8 shows WiFi-based work flows, in accordance with an aspect of the invention.

FIG. 8 shows an exemplary WiFi-based work flow. During in-door state 204, the smart phone will save BSSIDs of the WiFi access points close by into a list. Later, if any BSSID on the list is detected, the phone switches to in-door mode directly. If the BSSID disappears, the phone switches back to out-door mode. In particular, in the out-door state 202, the GPS receiver 108 is powered every minute or so to obtain the current location. If a WiFi BSSID on the in-door WiFi list is detected, the phone is switched to in-door state 204. In the in-door state 204, GPS receiver 108 is powered every hour or so to conserve energy. If the WiFi BSSID can not be detected for n minutes, the phone switches to out-door state 202.

Figure 9:
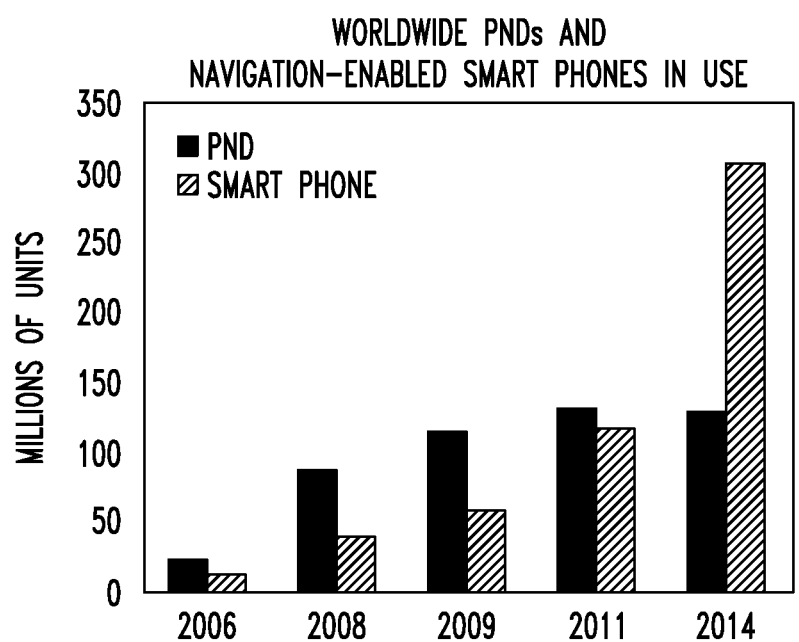
FIG. 9 shows historical and projected worldwide personal navigation device (PND) and navigation-enabled smart phones in use.

One exemplary application of one or more embodiments is location-based services on smart phones. These include navigation, social networking, advertisements, wellness, mobility pattern studies, and the like. Most smart phone applications are related to location-based services. Smart phones are very suitable platforms for location-based services, since they typically integrate GPS, an accelerometer, a compass, a gyroscope, a microphone, NFC/RFID (near field communications/radio frequency identification); provide seamless connectivity via 2G cellular, 3G/4G cellular, and WiFi to download and/or upload data; provide adequate computational power to consume data "smartly"; and are carried by users most of the time. Battery life continues to be a concern for most people. FIG. 9 shows the historical and projected future worldwide growth in personal navigation devices (PNDs) (left bar in each data set) and smart phones (right bar in each data set).

As noted, battery life a significant concern of many smart phone users. Most users require at least eight hours of battery life. Web-browsing, audio and/or video streaming, emails, and location acquisition are energy consuming. GPS receiver 108 can drain the battery completely in couple of hours. The GPS receiver is one of the most energy consuming pieces of hardware on many smart phones (one order of magnitude higher than the accelerometer; two orders of magnitude higher than the CPU 102).

Location-based services typically cannot stay on all the time. Heretofore, the reliance has been on users to turn off the applications when necessary, which is inconvenient. Furthermore, some current techniques employ sparse sampling with concomitant low data quality.

Figure 10:
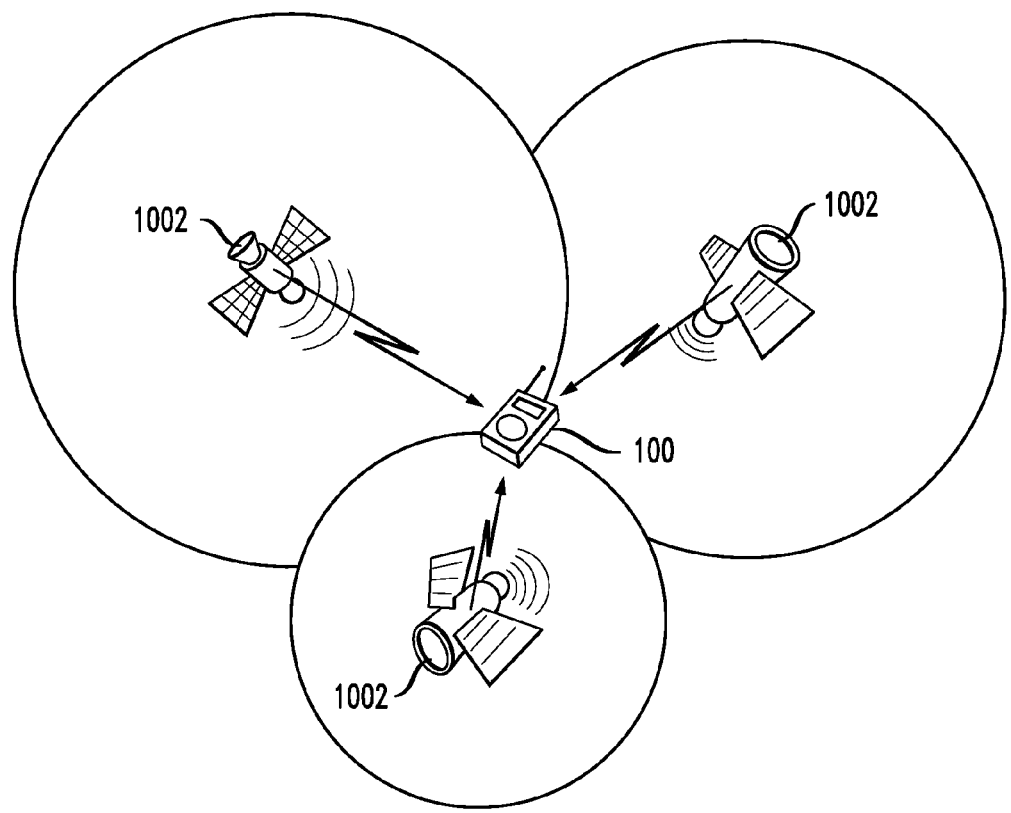
FIG. 10 a smart phone, implementing one or more aspects of the invention, in communication with global positioning system (GPS) satellites.

Reference should now be had to FIG. 10 for a GPS Energy Consumption Analysis. GPS employs 24 synchronized GPS satellites 1002 that broadcast timing beacons. Each GPS receiver on earth (e.g., in GPS-enabled phone 100) listens to at least three satellites 1002 and triangulates its own location. Energy consumption on a GPS receiver is linear to the listening time. The weaker the GPS signal, the longer the listening time. Tree canopy, buildings, and metal can all attenuate the GPS signal. For example, the listening time might be 100 ms in an outdoor environment with a clear sky vs. 1 minute in a building—orders of magnitude difference.

Figure 11:
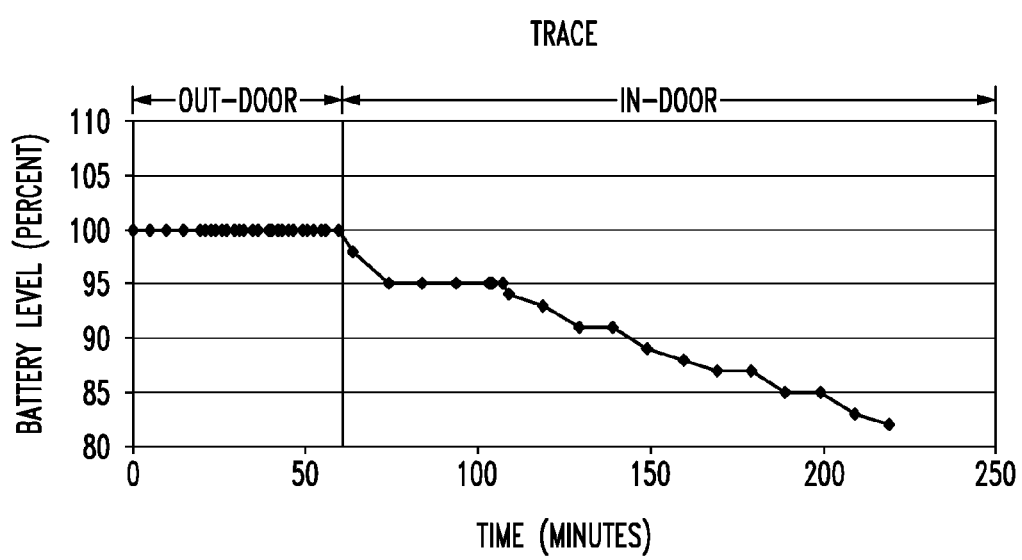
FIG. 11 depicts exemplary GPS energy consumption in indoor and outdoor environments.

FIG. 11 shows GPS Energy Consumption in in-door vs. out-door environments. Negligible energy consumption is noted out of doors, but a huge consumption is noted indoors. One or more embodiments provide a solution by toggling the GPS module 108 according to the in-door/out-door detection approach set forth herein.

Another non-limiting exemplary application includes auto-adaptation of ring tones. In many scenarios, smart phone users want to tune down or change ring tones when entering buildings. Currently, changing ring tones is done manually so it is inconvenient. In one or more embodiments, users set preferred ring tone states for in-door and out-door environments. The smart phone adapts ring tones automatically according to the in-door/out-door detection approach set forth herein.

Figure 2:
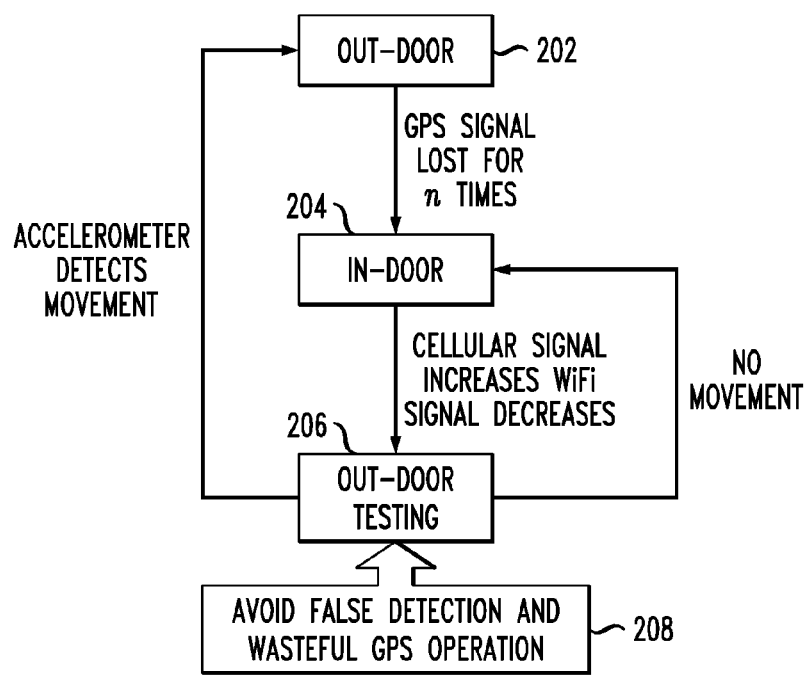
FIG. 2 is a basic work flow diagram, in accordance with an aspect of the invention.

Given the discussion thus far, and referring now to FIG. 2, it will be appreciated that, in general terms, an exemplary method, according to an aspect of the invention, includes the step 204 of operating a GPS-enabled cellular electronic device in an indoor mode. The device could be a cellular phone 100, portable GPS device, or the like. Further steps include detecting, at the GPS-enabled cellular electronic device, an increase in strength of a cellular signal; and, responsive at least to the increase in cellular signal strength, transitioning the GPS-enabled cellular electronic device to an outdoor testing mode 206. Still further steps include detecting whether movement of the GPS-enabled cellular electronic device occurs during the outdoor testing mode; and transitioning the GPS-enabled cellular electronic device to an outdoor mode 202, if the movement occurs.

In at least some instances, an additional step includes returning the GPS-enabled cellular electronic device to the indoor mode 204 if the movement does not occur.

In one or more embodiments, an additional step includes detecting, at the GPS-enabled cellular electronic device, a decrease in strength of a Wi-Fi signal; in such cases, the transitioning of the GPS-enabled cellular electronic device to the outdoor testing mode 206 is further responsive to the decrease in the Wi-Fi signal strength.

In one or more instances, additional steps include detecting, at the GPS-enabled cellular electronic device, a loss of a GPS signal while the GPS-enabled cellular electronic device is in the outdoor mode 202; and, responsive to the loss of the GPS signal, transitioning the GPS-enabled cellular electronic device back to the indoor mode 204.

In one or more embodiments, one or more actions are taken in response to entry into any one of the modes. For example, in some cases, additional steps include taking at least a first action in response to the transition to the outdoor mode and at least a second action in response to the transition back to the indoor mode. In one non-limiting example, the first action comprises switching a GPS module of the GPS-enabled cellular electronic device into a first mode where it is powered on at a first frequency; the second action comprises switching the GPS module of the GPS-enabled cellular electronic device into a second mode where it is powered on at a second frequency; and the second frequency is less than the first frequency to conserve power in the indoor mode. In another non-limiting example, the first action comprises changing a ring characteristic of the GPS-enabled cellular electronic device to an outdoor ring characteristic; and the second action comprises changing the ring characteristic of the GPS-enabled cellular electronic device to an indoor ring characteristic.

In some cases, an additional step includes activating at least one location-based service (e.g., a targeted advertisement based on entering a specific shop; this could also be linked to BSSID detection as discussed elsewhere herein) in response to the transition back to the indoor mode.

In at least some instances:
the detecting, at the GPS-enabled cellular electronic device, of the increase in strength of the cellular signal comprises determining that a sample of the strength of the cellular signal has increased relative to a preceding sample thereof and that an absolute value of a difference of the sample of the strength of the cellular signal from a mean value of the strength of the cellular signal exceeds twice a standard deviation of the strength of the cellular signal—see expression (1) above;
the detecting, at the GPS-enabled cellular electronic device, of the decrease in strength of the Wi-Fi signal comprises determining that a sample of the strength of the Wi-Fi signal has decreased relative to a preceding sample thereof and that an absolute value of a difference of the sample of the strength of the Wi-Fi signal from a mean value of the strength of the Wi-Fi signal exceeds twice a standard deviation of the strength of the Wi-Fi signal—see expression (2) above;
the detecting, at the GPS-enabled cellular electronic device, of the loss of the GPS signal comprises determining that a predetermined number of attempts (n) to acquire the GPS signal have failed; and
the detecting whether the movement of the GPS-enabled cellular electronic device occurs comprises determining whether an average, for a plurality of samples, of a sum of an absolute value of a change in acceleration in each of three orthogonal coordinate directions, exceeds a predetermined threshold—see expressions (3), (4), and (5) above.

As noted, one or more embodiments can adapt to loss of certain functions—see FIG. 7. For example, as per 704, in some cases, the detecting whether the movement of the GPS-enabled cellular electronic device occurs during the outdoor testing mode is carried out with an accelerometer, and further steps include, following the return to the indoor mode 204: determining that the accelerometer is not available, detecting another increase in the strength of the cellular signal, and detecting a decrease in strength of a Wi-Fi signal; and, responsive to the unavailability of the accelerometer, the another increase in the cellular signal strength, and the decrease in strength of the Wi-Fi signal, transitioning the GPS-enabled cellular electronic directly (i.e., no outdoor testing mode used) to the outdoor mode 202.

Referring now to FIG. 8, in some cases, additional steps include, during the indoor mode 204, detecting and recording at least one basic service set identification of at least one Wi-Fi wireless access point; and, following the transitioning to the outdoor mode 202, immediately switching back to the indoor mode 204 if the recorded basic service set identification of the at least one Wi-Fi wireless access point is again detected. In at least some such cases, further steps can include, following the immediate switching back to the indoor mode 204, returning to the outdoor mode 202 upon the recorded basic service set identification of the at least one Wi-Fi wireless access point not being detected for a predetermined time period, without entering the outdoor testing mode.

In another aspect, referring to FIG. 1 as a non-limiting example, a GPS-enabled cellular electronic device such as 100 includes a memory 112; a cellular transceiver module 104; a GPS receiver module 108; an accelerometer 114; and at least one processor 102, coupled to the memory 112, the cellular transceiver module, the accelerometer, and the GPS receiver module. The at least one processor is operative to carry out any one, some, or all of the corresponding method steps described above. Detection of increase in cellular signal strength can be carried out in conjunction with the cellular transceiver module. Detection of movement can be carried out in conjunction with the accelerometer. Detection of loss of the GPS signal can be carried out in conjunction with the GPS receiver module.

Optionally, a Wi-Fi transceiver module 106 is provided and is coupled to the at least one processor. Detection of decrease in strength of the Wi-Fi signal can be in conjunction with the Wi-Fi transceiver module.

In still another aspect, procedure 704 could be used in a device with no accelerometer. Thus, an exemplary method could include the step of operating a GPS-enabled cellular electronic device in an indoor mode 204; detecting, at the GPS-enabled cellular electronic device, an increase in strength of a cellular signal and a decrease in strength of a Wi-Fi signal; and, responsive to the increase in cellular signal strength and the decrease in Wi-Fi signal strength, transitioning the GPS-enabled cellular electronic device to an outdoor mode 202. Of course, in such instances, further steps could include detecting, at the GPS-enabled cellular electronic device, a loss of a GPS signal while the GPS-enabled cellular electronic device is in the outdoor mode 202; and, responsive to the loss of the GPS signal, transitioning the GPS-enabled cellular electronic device back to the indoor mode 204.

In yet another aspect, again referring to FIG. 1 as a non-limiting example, a GPS-enabled cellular electronic device such as 100 includes a memory 112; a cellular transceiver module 104; a GPS receiver module 108; a Wi-Fi transceiver module 106; and at least one processor 102, coupled to the memory 112, the cellular transceiver module, the Wi-Fi transceiver module, and the GPS receiver module. The at least one processor is operative to carry out any one, some, or all of the corresponding method steps described above.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, or an embodiment combining hardware and software (including firmware, resident software, microcode, etc.). Furthermore, at least some aspects of the present invention may take the form of a computer program product embodied in one or more computer readable medium(s) having computer readable program code embodied thereon (e.g., tangible media containing software to execute on a smart phone, portable GPS or the like).

One or more embodiments of the invention, or elements thereof, can be implemented in the form of an apparatus including a memory and at least one processor that is coupled to the memory and operative to perform exemplary method steps.

One or more embodiments can make use of software running on a portable device such as a cell phone or other GPS-enabled cellular electronic device. Please refer to the above discussion of FIG. 1. Such an implementation might employ, for example, a processor 102, a memory 112, and an input/output interface 110. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, can include, for example, one or more mechanisms for inputting data to the processing unit, and one or more mechanisms for providing results associated with the processing unit. The processor, memory, and input/output interface can be interconnected, for example, via bus.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Non-limiting examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It is envisioned that in many embodiments, the code will execute on a portable device such as a cell phone or other GPS-enabled cellular electronic device.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor to produce a machine, such that the instructions, which execute via the processor, create means for implementing the functions/acts specified in the flowchart and/or block diagram block or blocks.

These computer program instructions may also be stored in a computer readable medium that can direct a processor, or other device(s), to function in a particular manner, such that the instructions stored in the computer readable medium produce an article of manufacture including instructions which implement the function/act specified in the flowchart and/or block diagram block or blocks.

The computer program instructions may also be loaded onto a suitable processing apparatus to cause a series of operational steps to be performed thereon to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein that are implementable in whole or in part in software. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed processors with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    operating a GPS-enabled cellular electronic device in an indoor mode;
    detecting, at said GPS-enabled cellular electronic device, an increase in strength of a cellular signal;
    responsive at least to said increase in cellular signal strength, transitioning said GPS-enabled cellular electronic device to an outdoor testing mode;
    detecting whether movement of said GPS-enabled cellular electronic device occurs during said outdoor testing mode; and
    transitioning said GPS-enabled cellular electronic device to an outdoor mode, if said movement occurs;
    wherein in the indoor mode a GPS module of the GPS-enabled cellular electronic device is less frequently powered than when in the outdoor mode.

2. The method of claim 1, further comprising returning said GPS-enabled cellular electronic device to said indoor mode if said movement does not exceed a threshold within a predetermined time period according to a motion sensor of the GPS-enabled cellular electronic device.

3. The method of claim 1, further comprising detecting, at said GPS-enabled cellular electronic device, a decrease in strength of a Wi-Fi signal, wherein said transitioning of said GPS-enabled cellular electronic device to said outdoor testing mode is further responsive to said decrease in said Wi-Fi signal strength.

4. The method of claim 3, further comprising:
    detecting, at said GPS-enabled cellular electronic device, a loss of a GPS signal while said GPS-enabled cellular electronic device is in said outdoor mode; and
    responsive to said loss of said GPS signal, transitioning said GPS-enabled cellular electronic device back to said indoor mode.

5. The method of claim 4, further comprising taking at least a first action in response to said transition to said outdoor mode and at least a second action in response to said transition back to said indoor mode.

6. The method of claim 5, wherein:
said first action comprises switching a GPS module of said GPS-enabled cellular electronic device into a first mode where it is powered on at a first frequency rate;
said second action comprises switching said GPS module of said GPS-enabled cellular electronic device into a second mode where it is powered on at a second frequency rate; and
said second frequency rate is less than said first frequency rate to conserve power in said indoor mode.

7. The method of claim 5, wherein:
said first action comprises changing a ring characteristic of said GPS-enabled cellular electronic device to an outdoor ring characteristic; and
said second action comprises changing said ring characteristic of said GPS-enabled cellular electronic device to an indoor ring characteristic.

8. The method of claim 4, further comprising activating at least one location-based service in response to said transition back to said indoor mode.

9. The method of claim 2, further comprising:
during said indoor mode, detecting and recording at least one basic service set identification of at least one Wi-Fi wireless access point; and
following said transitioning to said outdoor mode, immediately switching back to said indoor mode if said recorded basic service set identification of said at least one Wi-Fi wireless access point is again detected.

10. The method of claim 9, further comprising, following said immediate switching back to said indoor mode, returning to said outdoor mode upon said recorded basic service set identification of said at least one Wi-Fi wireless access point not being detected for a predetermined time period, without entering said outdoor testing mode.

11. A method comprising:
operating a GPS-enabled cellular electronic device in an indoor mode, including periodically powering on a GPS module of said GPS-enabled cellular electronic device;
detecting, at said GPS-enabled cellular electronic device, an increase in strength of a cellular signal and a decrease in strength of a Wi-Fi signal; and
responsive to said increase in cellular signal strength and said decrease in Wi-Fi signal strength, transitioning said GPS-enabled cellular electronic device to an outdoor testing mode, wherein said outdoor testing mode includes using a motion sensor of the GPS-enabled cellular electronic device to detect movement of the GPS-enabled cellular electronic device;
responsive to determining said movement of the GPS-enabled cellular electronic device, transitioning said GPS-enabled cellular electronic device to an outdoor mode, including periodically powering on said GPS module of said GPS-enabled cellular electronic device;
wherein in said indoor mode said GPS module of the GPS-enabled cellular electronic device is less frequently powered on than when in said outdoor mode and when in said outdoor testing mode.

12. The method of claim 11, further comprising:
detecting, at said GPS-enabled cellular electronic device, a loss of a GPS signal while said GPS-enabled cellular electronic device is in said outdoor mode; and
responsive to said loss of said GPS signal, transitioning said GPS-enabled cellular electronic device back to said indoor mode.

13. A GPS-enabled cellular electronic device comprising:
a memory;
a cellular transceiver module;
a GPS receiver module;
an accelerometer; and
at least one processor, coupled to said memory, said cellular transceiver module, said accelerometer, and said GPS receiver module, and operative to:
operate said GPS-enabled cellular electronic device in an indoor mode;
detect, in conjunction with said cellular transceiver module, an increase in strength of a cellular signal;
responsive at least to said increase in cellular signal strength, transition said GPS-enabled cellular electronic device to an outdoor testing mode, wherein said transition to said outdoor testing mode comprises powering on said accelerometer for a predetermined time period;
detect, in conjunction with said accelerometer and during said predetermine time period, whether movement of said GPS-enabled cellular electronic device occurs during said outdoor testing mode; and
transition said GPS-enabled cellular electronic device to an outdoor mode, if said movement occurs within said predetermined time period and to said indoor mode otherwise;
wherein in said indoor mode said GPS receiver module of said GPS-enabled cellular electronic device is less frequently powered than when in said outdoor mode.

14. The GPS-enabled cellular electronic device of claim 13, wherein said at least one processor is further operative to return said GPS-enabled cellular electronic device to said indoor mode if said movement, detected by said accelerometer, does not exceed a threshold within a predetermined time period.

15. The GPS-enabled cellular electronic device of claim 14, further comprising a Wi-Fi transceiver module coupled to said at least one processor, wherein said at least one processor is further operative to detect, in conjunction with said Wi-Fi transceiver module, a decrease in strength of a Wi-Fi signal, wherein said at least one processor is operative to transition said GPS-enabled cellular electronic device to said outdoor testing mode also in response to said decrease in said Wi-Fi signal strength.

16. The GPS-enabled cellular electronic device of claim 15, wherein said at least one processor is further operative to:
detect, in conjunction with said GPS receiver module, a loss of a GPS signal while said GPS-enabled cellular electronic device is in said outdoor mode; and
responsive to said loss of said GPS signal, transition said GPS-enabled cellular electronic device back to said indoor mode.

17. The GPS-enabled cellular electronic device of claim 16, wherein said at least one processor is further operative to take at least a first action in response to said transition to said outdoor mode and at least a second action in response to said transition back to said indoor mode.

18. The GPS-enabled cellular electronic device of claim 17, wherein:
said first action comprises switching said GPS module of said GPS-enabled cellular electronic device into a first mode where it is powered on at a first frequency rate;
said second action comprises switching said GPS module of said GPS-enabled cellular electronic device into a second mode where it is powered on at a second frequency rate; and said second frequency rate is less than said first frequency rate to conserve power in said indoor mode.

19. The GPS-enabled cellular electronic device of claim 17, wherein:
said first action comprises changing a ring characteristic of said GPS-enabled cellular electronic device to an outdoor ring characteristic; and
said second action comprises changing said ring characteristic of said GPS-enabled cellular electronic device to an indoor ring characteristic.

20. The GPS-enabled cellular electronic device of claim 16, wherein said at least one processor is further operative to activate at least one location-based service in response to said transition back to said indoor mode.

21. A GPS-enabled cellular electronic device comprising:
a memory;
a cellular transceiver module;
a Wi-Fi transceiver module;
a GPS receiver module; and
at least one processor, coupled to said memory, said cellular transceiver module, said Wi-Fi transceiver module, and said GPS receiver module, and operative to:
operate said GPS-enabled cellular electronic device in an indoor mode, including periodically powering on said GPS receiver module;
detect, in conjunction with said cellular transceiver module and said Wi-Fi transceiver module, an increase in strength of a cellular signal and a decrease in strength of a Wi-Fi signal; and
responsive to said increase in cellular signal strength and said decrease in Wi-Fi signal strength, transition said GPS-enabled cellular electronic device to an outdoor testing mode, wherein said outdoor testing mode includes using a motion sensor of the GPS-enabled cellular electronic device to detect movement of the GPS-enabled cellular electronic device;
responsive to determining said movement of the GPS-enabled cellular electronic device, transition said GPS-enabled cellular electronic device to an outdoor mode, including periodically powering on said GPS receiver module;
wherein in said indoor mode said GPS receiver module of said GPS-enabled cellular electronic device is less frequently powered on than when in said outdoor mode.

22. The GPS-enabled cellular electronic device of claim 21, wherein said at least one processor is further operative to:
in conjunction with said GPS receiver module, detect a loss of a GPS signal while said GPS-enabled cellular electronic device is in said outdoor mode; and
responsive to said loss of said GPS signal, transition said GPS-enabled cellular electronic device back to said indoor mode.

23. A GPS-enabled cellular electronic device comprising:
means for operating said GPS-enabled cellular electronic device in an indoor mode;
means for detecting an increase in strength of a cellular signal;
means, responsive at least to said increase in cellular signal strength, for transitioning said GPS-enabled cellular electronic device to an outdoor testing mode;
means for detecting whether movement of said GPS-enabled cellular electronic device occurs during said outdoor testing mode; and
means for transitioning said GPS-enabled cellular electronic device to an outdoor mode, if said movement occurs;
wherein in the indoor mode a GPS module of the GPS-enabled cellular electronic device is less frequently powered than when in the outdoor mode.

* * * * *